(12) United States Patent
Davis, Jr. et al.

(10) Patent No.: US 8,370,225 B2
(45) Date of Patent: Feb. 5, 2013

(54) EQUIPMENT MANAGEMENT SYSTEM

(75) Inventors: Tommy Lee Davis, Jr., Florrisant, MO (US); David Earl Doser, Jr., Fenton, MO (US)

(73) Assignee: Prova Group, Inc., St. Louis, MO (US)

( * ) Notice: Subject to any disclaimer, the term of this patent is extended or adjusted under 35 U.S.C. 154(b) by 135 days.

(21) Appl. No.: 12/950,585

(22) Filed: Nov. 19, 2010

(65) Prior Publication Data

US 2011/0153471 A1 Jun. 23, 2011

Related U.S. Application Data

(63) Continuation of application No. 11/086,943, filed on Mar. 22, 2005, now Pat. No. 7,840,453, which is a continuation of application No. 10/038,292, filed on Jan. 4, 2002, now abandoned.

(51) Int. Cl.
*G06F 17/60* (2006.01)
*G08B 26/00* (2006.01)

(52) U.S. Cl. ............................................ 705/29; 705/52

(58) Field of Classification Search .................... 705/29, 705/1; 382/100
See application file for complete search history.

(56) References Cited

U.S. PATENT DOCUMENTS

| | | |
|---|---|---|
| 2,292,387 A | 8/1942 | Markey et al. |
| 4,277,837 A | 7/1981 | Stuckert |
| 4,386,266 A | 5/1983 | Chesarek |
| 4,529,870 A | 7/1985 | Chaum |
| 4,636,950 A | 1/1987 | Caswell et al. |
| 4,686,515 A | 8/1987 | Anderson et al. |
| 4,688,026 A | 8/1987 | Scribner et al. |
| 4,689,478 A | 8/1987 | Hale et al. |
| 4,816,824 A | 3/1989 | Katz et al. |
| 4,857,716 A | 8/1989 | Gombrich et al. |
| 5,050,031 A | 9/1991 | Weiley |
| 5,267,315 A | 11/1993 | Narita et al. |
| 5,267,756 A | 12/1993 | Molee et al. |
| 5,276,311 A | 1/1994 | Hennige |
| 5,288,980 A | 2/1994 | Patel et al. |
| 5,306,049 A | 4/1994 | Schireck |
| 5,319,544 A | 6/1994 | Schmerer et al. |
| 5,361,134 A | 11/1994 | Hu et al. |
| 5,380,047 A | 1/1995 | Molee et al. |
| 5,436,970 A | 7/1995 | Ray et al. |
| 5,521,984 A | 5/1996 | Denenberg et al. |

(Continued)

FOREIGN PATENT DOCUMENTS

| | | |
|---|---|---|
| WO | 9855970 | 10/1998 |
| WO | 0101706 | 1/2001 |

(Continued)

OTHER PUBLICATIONS

Roussos, et al.; A Case Study in Pervasive Retail; WMC, Sep. 28, 2002.

(Continued)

*Primary Examiner* — Evens J Augustin
(74) *Attorney, Agent, or Firm* — Jackson Walker L.L.P.; Christopher J. Rourk

(57) ABSTRACT

The invention is a system and method of managing equipment. The system incorporates a tagging device to attach identification tags to each piece of equipment. A scanning device is used to read the identification tags and relay this information to an equipment server. An input device is used to input information to the equipment server. The equipment server runs the equipment management program. The system flags a potential asset assigned to an asset creating individual. Equipment is designated an asset after use in an asset creating event.

18 Claims, 4 Drawing Sheets

U.S. PATENT DOCUMENTS

| | | | |
|---|---|---|---|
| 5,548,110 | A | 8/1996 | Storch et al. |
| 5,578,808 | A | 11/1996 | Taylor |
| 5,585,787 | A | 12/1996 | Wallerstein |
| 5,595,356 | A | 1/1997 | Kewin |
| 5,604,802 | A | 2/1997 | Holloway |
| 5,635,693 | A | 6/1997 | Benson et al. |
| 5,640,002 | A | 6/1997 | Ruppert et al. |
| 5,642,419 | A | 6/1997 | Rosen |
| 5,673,338 | A | 9/1997 | Denenberg et al. |
| 5,689,561 | A | 11/1997 | Pace |
| 5,732,401 | A | 3/1998 | Conway |
| 5,737,886 | A | 4/1998 | Kruckemeyer |
| 5,770,843 | A | 6/1998 | Rose et al. |
| 5,774,876 | A | 6/1998 | Woolley et al. |
| 5,777,884 | A | 7/1998 | Belka et al. |
| 5,794,213 | A | 8/1998 | Markman |
| 5,796,351 | A | 8/1998 | Yabuki |
| 5,825,299 | A | 10/1998 | Fuentes et al. |
| 5,825,302 | A | 10/1998 | Stafford |
| 5,870,733 | A | 2/1999 | Bass et al. |
| 5,878,416 | A | 3/1999 | Harris et al. |
| 5,895,073 | A | 4/1999 | Moore |
| 5,930,770 | A | 7/1999 | Edgar |
| 5,963,133 | A | 10/1999 | Monjo |
| 5,963,134 | A * | 10/1999 | Bowers et al. ............ 340/572.1 |
| 5,963,919 | A | 10/1999 | Brinkley et al. |
| 5,971,435 | A | 10/1999 | DiCesare et al. |
| 6,002,344 | A | 12/1999 | Bandy et al. |
| 6,026,378 | A | 2/2000 | Onozaki |
| 6,030,001 | A | 2/2000 | Kruckemeyer |
| 6,061,656 | A | 5/2000 | Pace |
| 6,070,141 | A | 5/2000 | Houvener et al. |
| 6,076,064 | A | 6/2000 | Rose, Jr. |
| 6,112,984 | A | 9/2000 | Snavely |
| 6,131,811 | A | 10/2000 | Gangi |
| 6,148,091 | A | 11/2000 | DiMaria |
| 6,149,055 | A | 11/2000 | Gatto |
| 6,170,746 | B1 | 1/2001 | Brook et al. |
| 6,195,006 | B1 | 2/2001 | Bowers et al. |
| 6,203,069 | B1 | 3/2001 | Outwater et al. |
| 6,224,109 | B1 | 5/2001 | Yang |
| 6,226,619 | B1 | 5/2001 | Halperin et al. |
| 6,232,876 | B1 | 5/2001 | Maloney |
| 6,250,549 | B1 | 6/2001 | DeFabio, Jr. |
| 6,265,977 | B1 | 7/2001 | Vega et al. |
| 6,266,651 | B1 | 7/2001 | Woolston |
| 6,270,011 | B1 | 8/2001 | Gottfried |
| 6,304,856 | B1 | 10/2001 | Soga et al. |
| 6,305,603 | B1 | 10/2001 | Grunbok et al. |
| 6,309,690 | B1 | 10/2001 | Brogger et al. |
| 6,324,522 | B2 | 11/2001 | Peterson et al. |
| 6,325,292 | B1 | 12/2001 | Sehr |
| 6,330,971 | B1 | 12/2001 | Mabry et al. |
| 6,338,053 | B2 | 1/2002 | Uehara et al. |
| 6,346,885 | B1 * | 2/2002 | Curkendall ................ 340/572.4 |
| 6,357,662 | B1 | 3/2002 | Helton et al. |
| 6,402,029 | B1 | 6/2002 | Gangi |
| 6,415,978 | B1 | 7/2002 | McAllister |
| 6,431,439 | B1 | 8/2002 | Suer et al. |
| 6,480,108 | B2 * | 11/2002 | McDonald ................... 340/505 |
| 6,494,367 | B1 | 12/2002 | Zacharias |
| 6,505,094 | B2 | 1/2003 | Pape et al. |
| 6,557,758 | B1 | 5/2003 | Monico |
| 6,559,620 | B2 * | 5/2003 | Zhou et al. ................... 320/101 |
| 6,591,252 | B1 | 7/2003 | Young |
| 6,594,475 | B1 * | 7/2003 | Anvekar et al. ............ 455/277.1 |
| 6,676,017 | B1 | 1/2004 | Smith, III |
| 6,686,881 | B1 | 2/2004 | Lu et al. |
| 6,700,493 | B1 * | 3/2004 | Robinson .................. 340/573.1 |
| 6,707,381 | B1 | 3/2004 | Maloney |
| 6,714,121 | B1 * | 3/2004 | Moore .......................... 340/10.3 |
| 6,735,324 | B1 * | 5/2004 | McKinley et al. ............ 382/100 |
| 6,750,765 | B1 * | 6/2004 | van Wijk ....................... 340/505 |
| 6,758,403 | B1 | 7/2004 | Keys et al. |
| 6,763,996 | B2 | 7/2004 | Rakers et al. |
| 6,774,811 | B2 | 8/2004 | Kaufman et al. |
| 6,816,075 | B2 | 11/2004 | Grunes et al. |
| 6,847,892 | B2 * | 1/2005 | Zhou et al. .................... 701/213 |
| 6,956,538 | B2 * | 10/2005 | Moore .......................... 343/878 |
| 7,019,644 | B2 * | 3/2006 | Barrie ...................... 340/539.13 |
| 7,114,656 | B1 | 10/2006 | Garver |
| 7,129,837 | B2 * | 10/2006 | Shannon et al. ......... 340/539.13 |
| 7,136,832 | B2 * | 11/2006 | Li et al. ............................ 705/34 |
| 7,156,312 | B2 * | 1/2007 | Becker et al. ................. 235/492 |
| 7,158,038 | B2 * | 1/2007 | Fujie .......................... 340/573.4 |
| 7,298,264 | B1 * | 11/2007 | Kuzma et al. .............. 340/572.1 |
| 8,234,185 | B2 | 7/2012 | Davis, Jr. |
| 2001/0000019 | A1 | 3/2001 | Bowers et al. |
| 2001/0014955 | A1 | 8/2001 | Achiwa et al. |
| 2001/0018660 | A1 | 8/2001 | Sehr |
| 2001/0034717 | A1 | 10/2001 | Whitworth |
| 2001/0041214 | A1 | 11/2001 | Brogger et al. |
| 2001/0042059 | A1 | 11/2001 | Uehara et al. |
| 2001/0047340 | A1 | 11/2001 | Snow et al. |
| 2001/0049606 | A1 | 12/2001 | Lucarelli |
| 2001/0051905 | A1 * | 12/2001 | Lucas ............................. 705/29 |
| 2002/0005774 | A1 * | 1/2002 | Rudolph et al. ............. 340/5.61 |
| 2002/0029342 | A1 | 3/2002 | Keech |
| 2002/0049507 | A1 | 4/2002 | Hameen-Anttila |
| 2002/0049656 | A1 | 4/2002 | Lancos et al. |
| 2002/0052193 | A1 | 5/2002 | Chetty |
| 2002/0059147 | A1 | 5/2002 | Ogasawara |
| 2002/0073044 | A1 | 6/2002 | Singhal |
| 2002/0077956 | A1 | 6/2002 | Solhelm |
| 2002/0107610 | A1 | 8/2002 | Kaehler et al. |
| 2002/0111819 | A1 * | 8/2002 | Li et al. ............................. 705/1 |
| 2002/0123955 | A1 | 9/2002 | Andreski |
| 2002/0143635 | A1 | 10/2002 | Goodwin |
| 2002/0158751 | A1 | 10/2002 | Bormaster |
| 2002/0161666 | A1 | 10/2002 | Fraki et al. |
| 2002/0165817 | A1 | 11/2002 | Rackson et al. |
| 2002/0188702 | A1 * | 12/2002 | Short et al. .................... 709/220 |
| 2002/0190862 | A1 | 12/2002 | Berquist et al. |
| 2003/0007464 | A1 | 1/2003 | Balani |
| 2003/0034390 | A1 * | 2/2003 | Linton et al. .................. 235/382 |
| 2003/0069648 | A1 | 4/2003 | Douglas et al. |
| 2003/0105555 | A1 * | 6/2003 | Lunak et al. .................. 700/237 |
| 2003/0120745 | A1 | 6/2003 | Katagishi et al. |
| 2003/0195818 | A1 | 10/2003 | Howell et al. |
| 2003/0220885 | A1 | 11/2003 | Lucarelli et al. |
| 2004/0088231 | A1 * | 5/2004 | Davis, Jr. ........................ 705/28 |
| 2004/0098350 | A1 | 5/2004 | Labrou et al. |
| 2004/0122735 | A1 | 6/2004 | Meshkin |
| 2004/0171381 | A1 | 9/2004 | Inselberg |
| 2005/0289061 | A1 | 12/2005 | Kulakowski et al. |
| 2006/0190384 | A1 | 8/2006 | Gurley et al. |

FOREIGN PATENT DOCUMENTS

| | | |
|---|---|---|
| WO | 0157807 | 8/2001 |
| WO | 0172107 | 10/2001 |
| WO | 0184268 | 11/2001 |
| WO | 0188884 | 11/2001 |

OTHER PUBLICATIONS

Horngren, Charles T. et al.; Introduction to Financial Accounting, Revised 3rd Ed., Prentice-Hall, Inc., 1988.

Borland Paradox for Windows User's Guide, Borland International, Inc., 1994.

Riley, David D., Data Abstraction and Structure, An Introduction to Computer Science II, Boyd and Fraser Publishing Company, 1987.

White, Ron; How Computers Work, Millennium Ed. Que Corporation, Sep. 1999.

Derfler, Frank J., et al; How Networks Work, Millennium Ed., Que Corporation, Jan. 2000.

Gralla, Preston, How the Internet Works, Millennium Ed., Que Corporation, Aug. 1999.

2 Groups With the Same Reid/Holography Licence Tags Idea, Holography News, Dec. 2002.

U.S. Patent and Trademark Office; Non-Final Rejection; U.S. Appl. No. 10/694,311, Oct. 29, 2007.

U.S. Patent and Trademark Office; Response to Non-Final Rejection; U.S. Appl. No. 10/694,311, Jan. 29, 2008.

U.S. Patent and Trademark Office; Final Rejection; U.S. Appl. No. 10/694,311, Apr. 2, 2008.

U.S. Patent and Trademark Office; Appeal Brief; U.S. Appl. No. 10/694,311, Nov. 3, 2008.
U.S. Patent and Trademark Office; Examiner's Answer; U.S. Appl. No. 10/694,311, Mar. 13, 2009.
U.S. Patent and Trademark Office; Reply to Examiner's Answer; U.S. Appl. No. 10/694,311, May 13, 2009.
U.S. Patent and Trademark Office; Decision on Appeal; U.S. Appl. No. 10/694,311, Oct. 27, 2011.
U.S. Patent and Trademark Office; Request to Reopen Prosecution; U.S. Appl. No. 10/694,311, Dec. 27, 2011.

* cited by examiner

EQUIPMENT MANAGEMENT SYSTEM

This application is a continuation application of U.S. Ser. No. 11/086,943 filed Mar. 22, 2005, now U.S. Pat. No. 7,840,453, issued Nov. 23, 2010, entitled "EQUIPMENT MANAGEMENT SYSTEM," which is a continuation application of U.S. Ser. No. 10/038,292, filed Jan. 4, 2002 entitled "EQUIPMENT MANAGEMENT SYSTEM," now abandoned. This application is also related to U.S. Pat. No. 8,234,185, issued Jul. 31, 2012, entitled "SYSTEM AND METHOD FOR TRACKING AUTHENTICATED ITEMS," and pending U.S. Continuation patent application Ser. No. 13/556,002, filed Jul. 23, 2012, entitled "SYSTEM AND METHOD FOR TRACKING AUTHENTICATED ITEMS."

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to a system for the management of equipment, and particularly to the management of sports equipment. The invention identifies inventory, tracks inventory during the conversion from its status from inventory to valued asset, and provides a provenance for items of sports memorabilia.

Tracing its origins to the trading cards children would collect and trade of their favorite professional athletes, the sports memorabilia market is now a huge industry. Sports enthusiasts will pay large sums of money for items associated with their favorite teams and players. A visit to any professional sporting venue reveals stores selling replica jerseys. Labels sewn into the jerseys stating "Official" or "Authentic" are intended to convince the purchaser that the item is identical to the one worn by their favorite player. Even more valuable to a collector is an item actually worn or used in a game. Collectors today will pay much more for a jersey or other piece of equipment used in a game.

As in the antique industry, with sports memorabilia, the history of an item is important when calculating value. For example, a civil war era pistol is a valuable item to a collector. A civil war era pistol owned by U.S. Grant or Robert E. Lee would be worth considerably more. An item separate from such a pistol that establishes a history of ownership is called provenance. In the sports memorabilia industry provenance can enhance the value of an item. For example, if a player sets a record in a game, the jersey he wears while breaking that record will be valuable. After the game, some person must take possession of the jersey and deliver it to a prospective buyer with some assurance that the jersey is the one worn in the game. Because of the potential money at stake, there is incentive for dishonesty.

One of the main concerns for this industry is authenticity. A common method of authentication is to have the athlete sign an item for sale. According to information on the Federal Bureau of Investigation (FBI) website more than fifty percent of autographed memorabilia may be forged. The forged items are often provided with forged certificates of authenticity and photographs of the athlete signing a similar item. Unfortunately, unless the collector receives the item directly from the athlete there is often no way of being sure of authenticity.

A professional sports team is operated as a business. Identifying and exploiting new revenue sources is critical to success. It is also important to minimize expenses.

There is a need for a system which can account for every piece of equipment owned by a team and the use of that equipment. U.S. Pat. No. 6,195,006 (herein incorporated by reference) to Bowers et al. discloses an inventory system using RFID tags. This system can account for every piece of inventory and provide circulation status. U.S. Pat. No. 5,796,351 (herein incorporated by reference) to Yabuki discloses a system for providing information about exhibition objects. These systems could be adapted for use with the equipment used by a sports team but neither of these systems would be able to identify a piece of sports memorabilia and provide a record of its use in a game. There is a need for a system which can identify a piece of equipment used in a game which can subsequently be sold as a piece of sports memorabilia. There is a further need for a system which can provide the provenance of an item of sports memorabilia. The provenance provides a history of the item as well as authentication. This invention fills these needs.

BRIEF SUMMARY OF THE INVENTION

The invention is a system and method of managing equipment. The invention identifies inventory, tracks inventory outflows and inflows, and manages inventory during the conversion from its status from inventory to valued asset to establish the provenance of the piece of equipment. The system incorporates a tagging device to attach identification tags to each piece of equipment. A reading device such as a scanner, is used to read the identification tags and this information is ultimately relayed to an equipment server. An input device (which could be the reading device) is used to input information to the equipment server. The equipment server runs the equipment management program.

In use, the system first receives equipment into inventory. The equipment is then identified by group and type. Equipment groups are user defined labels (e.g. game jerseys, boxing gloves, shorts). Equipment types have any number of fixed (e.g. catalog item number) and optional properties (e.g. size). The collection of all of the equipment is the inventory.

If not already present, an identification tag is affixed to each piece of equipment. Each identification tag is then scanned. The scanned value is then assigned an equipment group and equipment type. These values are sent to the equipment server and stored in an inventory database. This process is repeated for each piece of equipment.

Next the equipment is issued to an individual. Each piece of equipment is scanned, or identified as it is issued to an individual. Using the input device, the individual's profile is accessed and the piece of equipment is registered to that individual. A time and date stamp is included.

Finally, the equipment is returned. Each piece of equipment is scanned as it is returned. Using the input device, the piece of equipment is indicated as returned and whether the equipment was used in an value-enhancing event.

The equipment management program may indicate whether the piece of equipment has been transformed into a valued asset, or whether the piece of equipment should be returned to inventory to be reassigned later.

BRIEF DESCRIPTION OF THE SEVERAL VIEWS OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE INVENTION

Figure 1:
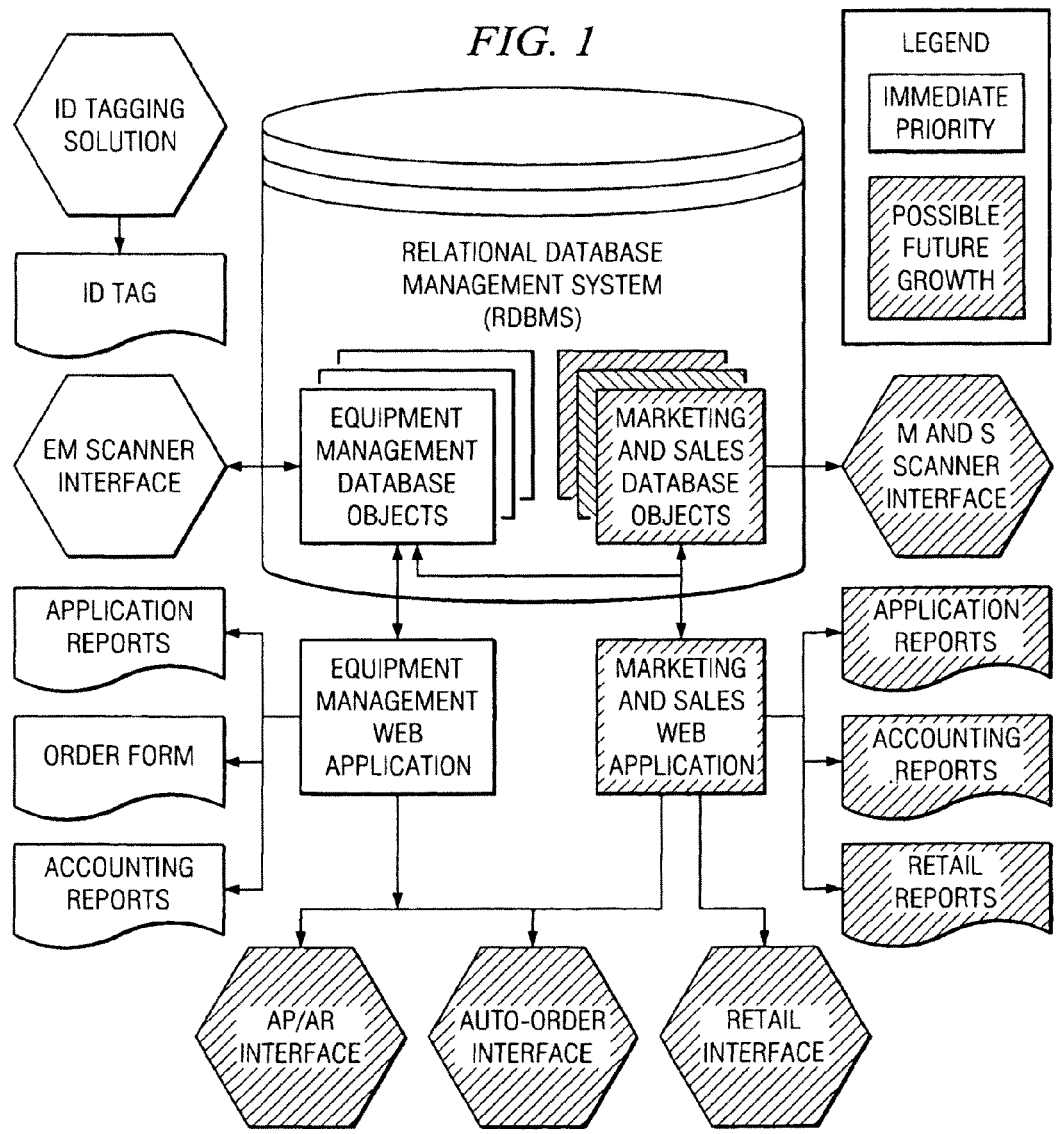
FIG. 1 is a diagram of the system architecture.

The physical components of the system can be seen in FIG. 1. A tagging device 10 is used to attach an identification tag 12 to a piece of equipment. The identification tag 12 can be any portable unique identifier. In the preferred embodiment, identification tag 12 is a barcode. However, it should be understood that any suitable identifier may be used, so long as the piece of equipment is uniquely identified. Thus, the unique identification tag 12 may take the form of a radio frequency (RF) tag, a magnetic strip tag, an electronically operated tag, or a biological tag.

Scanning device 14 is used to read the identification tag 12. The scanning device 14 can be any type of scanning device, but in the preferred embodiment the scanning device 14 is a barcode reader. The invention will also work with a bulk type scanner capable of scanning many pieces of equipment simultaneously.

The scanning device 14 is in communication with a hand-held personal computer (PC) 16. The PC 16 is connected to the scanning device 14 by any acceptable means, but in the preferred embodiment a radio frequency switch 18 is used. The scanning device 14 can also be connected by a hard-wired attachment such as a serial cable or USB cable, or by a wireless device such as by infrared communication. The scanning device 14 can also be integrated directly into the PC 16.

In the preferred embodiment, the PC 16 is connected to an application server 20 by a hard-wired (serial or USB cable) attachment through a cradle 22. Any other suitable attachment means can be used including RF and IR connections. The application server 20 interacts with a web browser 24 allowing remote access.

The scanning device 14 and the PC 16 can be operated using any suitable operating system, but in the preferred embodiment MICROSOFT WINDOWS CE is used. The application server and web browser can use any suitable program but in the preferred embodiment MICROSOFT WINDOWS NT AND INTERNET EXPLORER are used, respectively. The equipment management program runs on the application server 20 and can be any inventory management program capable of being customized.

The equipment management program is used to organize and store information. Information is stored in equipment management databases. The information in the databases is used by an application server to generate different reports.

The program stores information in two types of databases. The first database is the equipment database. The second database is the individual database. The equipment database stores information for each piece of equipment. The first component of information is an identification code. This information corresponds to the portable unique identifier located on the piece of equipment. The next component is an asset flag that can be turned on and off. A status component is either activated or deactivated. Equipment group is a user-defined label. For example an equipment group can be designated "Practice Jersey", "Indoor Shoes", "Boxing Gloves", "Helmet", "Home Game Jersey", "Soccer Shorts", "Baseball Bat", etc. Equipment type consists of any number of fixed and optional properties. Fixed properties can be information such as the catalog number. Optional properties include items such as size or sleeve length. Also included in the equipment database is assignment information.

The individual database has information on each individual in the system. This information includes identification of the individual, asset creation status, equipment preferences, and equipment assignments.

Figure 3:
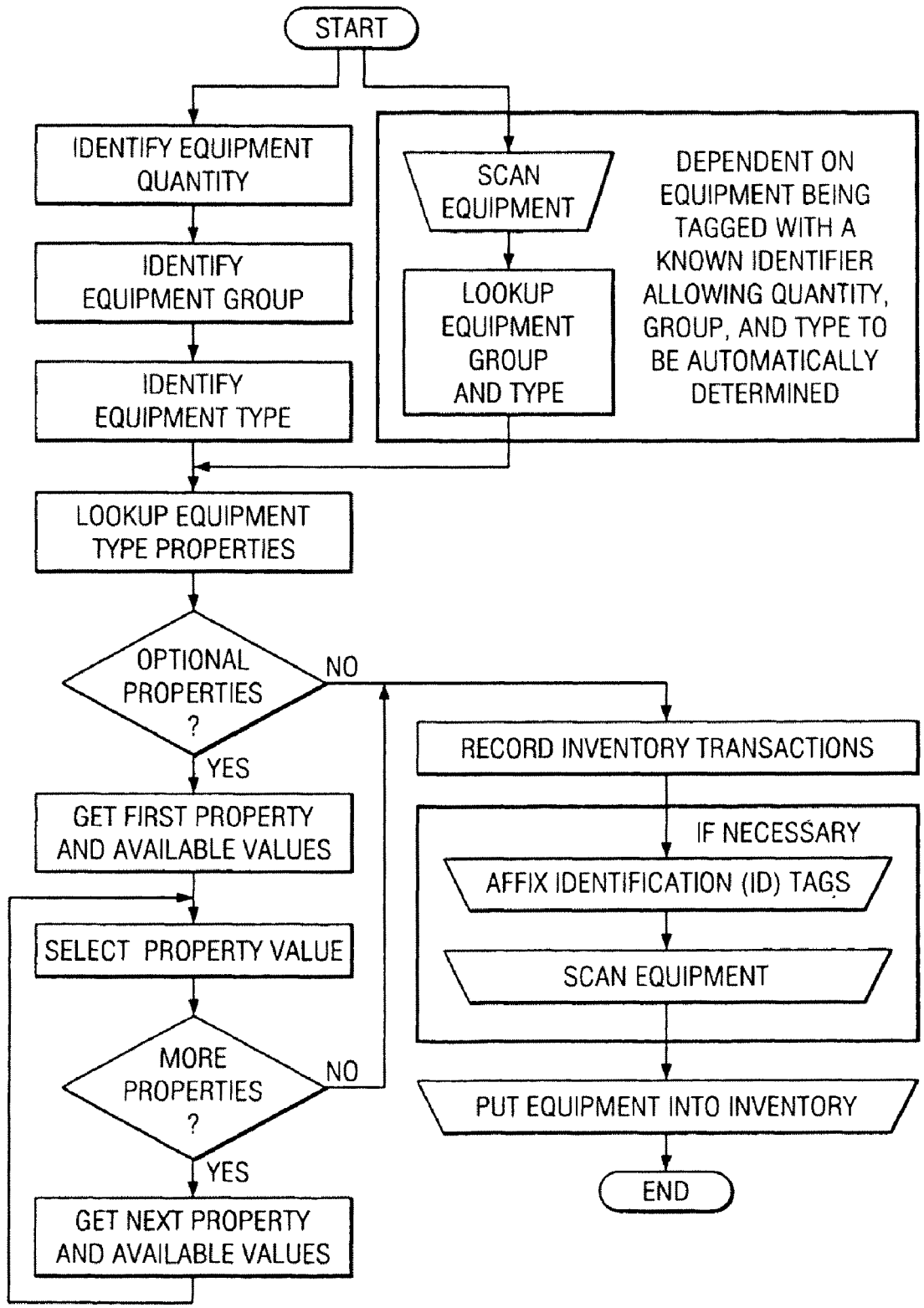
FIG. 3 is a flowchart of the equipment reception step.

The system is used to manage equipment and identify assets. Referring to FIG. 3, it can be seen how the system is used. To start using the system, every current piece of equipment and every incoming piece of equipment must be examined for a portable unique identifier tag 12. It should be noted that the term "tag" does not require a certain geometrical shape, and specifically, does not require a rectangular shape After affixing a portable unique identifier tag 12 to the equipment where missing, the information on the equipment and unique identifier tag 12 is entered into the system. This is done by reading the portable unique identifier tag 12 with the scanning device 14. The equipment group, equipment type and any optional properties are then associated with the piece of equipment. This is repeated until each piece of all equipment with unique identifier tag 12 is entered into the system's first database.

Figure 4:
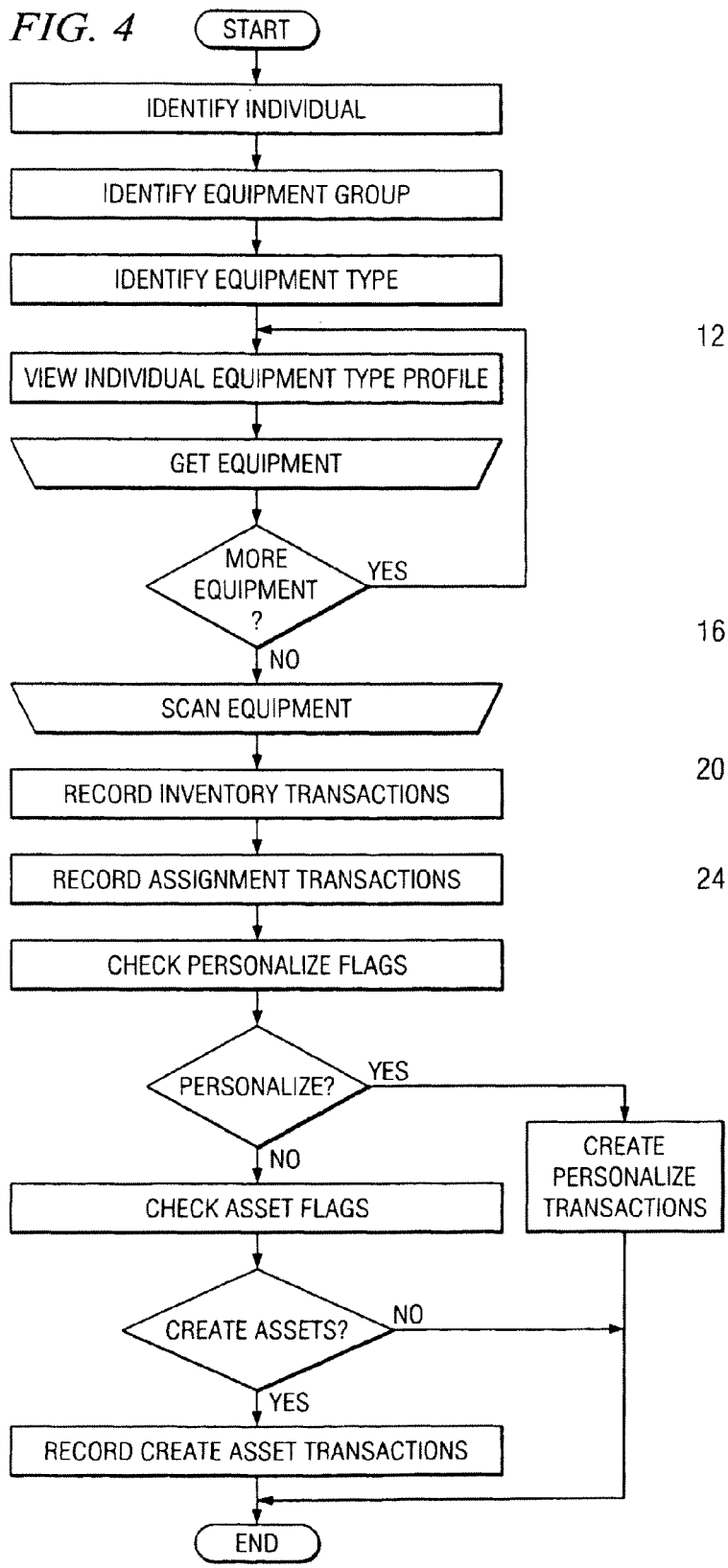
FIG. 4 is a flowchart of the equipment issue step.
Figure 2:
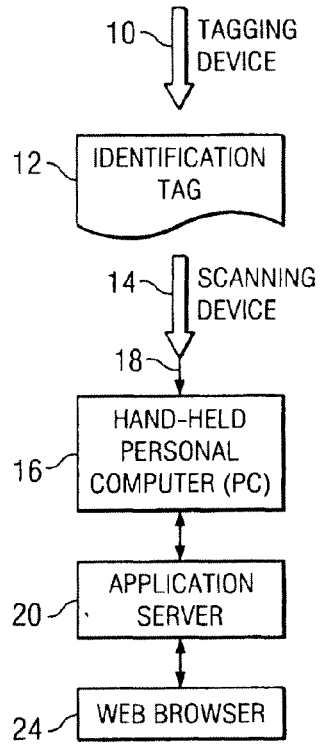
FIG. 2 is a diagram of the application server.

The next step is to issue the equipment. This process is shown in FIG. 4. After identifying the individual who is receiving equipment, the system calls up that individual's equipment profile. This is a list of all the equipment which needs to be assigned to that individual. An individual can have several equipment profiles depending upon the scheduled activity. For example, the individual can have a practice profile and a game profile. After all of the proper equipment is selected after consulting the individual's profile, the selected equipment is scanned, the equipment status associated with each piece of equipment is changed to assigned, and the equipment is handed over to the individual. Finally, a time and date stamp is associated with the transaction. This updates the equipment profile in the equipment database and updates information on the individual's profile in the individual profile database. In the equipment profile database, the individual's name is associated with each piece of equipment handed out. In the individual profile database, the piece of equipment is associated with an "assigned equipment" list.

Figure 5:
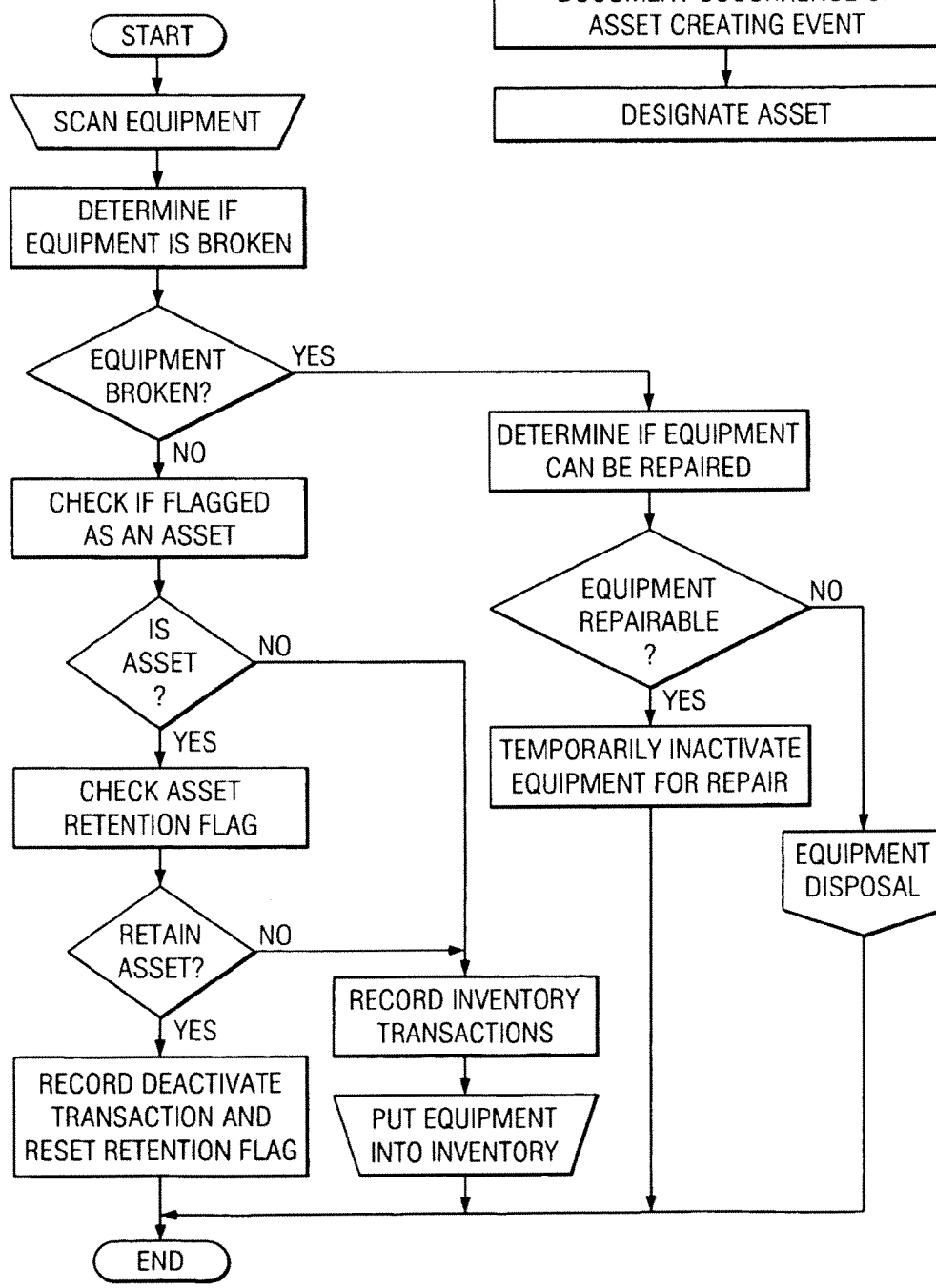
FIG. 5 is a flowchart of the equipment return step.

The return of equipment is similar to the issue equipment process. This process is shown in FIG. 5. Equipment is returned by the individual, and the identification tags 12 associated with the equipment is scanned. The equipment is physically inspected to determine whether it is broken. If broken, a determination is made to see whether the equipment can be repaired. If repairable, the equipment is inactivated. If not repairable, the equipment is sent to equipment disposal. If the equipment is not broken, the equipment is checked to see if it is an asset. No equipment can become an asset until after an asset-creating event has occurred and has been documented by the system. An asset-creating event can be any event, but in the preferred embodiment, an asset-creating event is a game. If not an asset, the equipment profile database and individual profile database are updated. If it is an asset, a check is made to see if the asset should be retained. If the asset is to be retained the equipment is deactivated and set aside for disposal. If the asset is not to be retained, equipment and individual profiles are updated. The usage of the equipment is then recorded in the system. An example of this would be to indicate the piece of equipment was used in a game.

The equipment program uses a two-step process to designate a piece of equipment an asset. Using the input device the asset flag can be turned on for an equipment group. Indeed, with the desire by collectors and sports fans to possess "authentic" jerseys or equipment, even equipment that is unassigned in inventory can become valuable. All equipment in that group then becomes a potential asset. The next step is to set the asset status in the individual profiles. The default setting in all individual profiles turns the asset flag off when a piece of equipment is assigned to that individual. For a specifically identified individuals, the default setting is reversed and the asset flag stays turned on when the equipment is assigned to that individual. Generally, only the team stars would have this asset setting.

The equipment management program creates a history file for each piece of equipment. The history file includes information relating to the assignment and use of the piece of equipment. Such history information may include, but is not limited to, the name of the individual using the equipment, the dates and times of use, the opposing team or opposing player, various records achieved or broken during the use of the equipment, etc. This information is stored in the equipment application server and can be accessed via the Internet using a web browser. Accordingly, a person selling an asset as an article of sports memorabilia may access the history file and demonstrate authenticity as well as the provenance of the item.

The equipment management program also has an order form generation feature. When a piece of equipment is deactivated and disposed of (i.e. broken or sold as an asset) the program may automatically generate a complete order form, or may electronically place an order for replacement equipment using the equipment profile.

The equipment management program also has a post activity update feature. For example, a future Hall of Fame athlete can create a market demand for game-worn equipment. A report is generated detailing every piece of equipment ever assigned to the individual. The results are then filtered by equipment group. The desired results are then deactivated and designated for disposal.

The equipment management system of the present invention provides accountability for every piece of equipment. It should be noted that the invention is drawn to an improved method of using a known system to manage equipment. The above described system is indicative of the type of system the invention is intended to work with, but should not be construed as the only type of system the method works with. The invention is intended to function with any type of equipment management system. The improvement involves the ability to identify or flag a piece of equipment assigned to an asset-creating individual. In the preferred embodiment, an asset-creating individual for a sports team is identified as any player that can create a market for game-used equipment. In most cases this would be a fan favorite player. It is specifically pointed out that the system may also function with athletes participating in non-team, individual sports, such as boxing, tennis, swimming, track and field, etc. A potential asset is defined as any piece of equipment which becomes valuable when used in an asset creating event. In the preferred embodiment potential assets are items like game jerseys, shoes, helmets, boxing gloves, shorts, baseball bats, baseball gloves, shirts, hats, etc.

Figure 6:
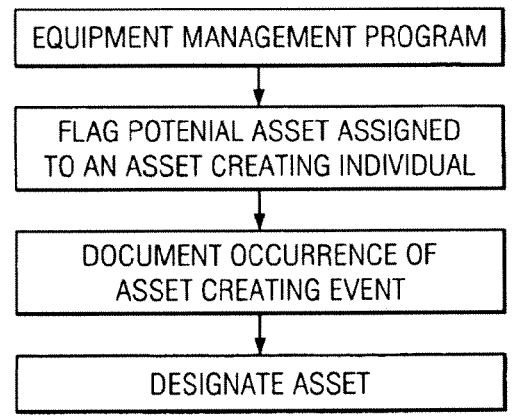
FIG. 6 is a flowchart of the improved method of equipment management.

The improvement is shown in the flowchart of FIG. 6. The invention identifies items meeting the following three criteria: 1) potential assets, 2) assigned to asset creating individuals, 3) used in an asset-creating event. The preferred embodiment above uses a flag to identify an asset. The flag is turned on for all members of an equipment group. The flag is then turned off if the equipment is assigned to a non asset creating individual, but left on when assigned to an asset creating individual. After an asset-creating event has taken place, the system designates an asset for any flagged piece of equipment. It should be noted that any number of other methods could be used to designate an asset, and the invention is intended to encompass those variants. For example the system could flag all equipment assigned to an asset-creating individual and turn the flag off for any piece of equipment not in a designated equipment group. The invention is intended to cover a method of assigning a flag to a piece of equipment designated a potential asset and assigned to an asset-creating individual.

In view of the foregoing, it will be seen that the several advantages of the invention are achieved and attained. The preferred embodiment and alternatives were chosen and described in order to best explain the principles of the invention and its practical application to thereby enable others skilled in the art to best utilize the invention in various embodiments and with various modifications as are suited to the particular use contemplated. As various modifications could be made in the constructions and methods herein described and illustrated without departing from the scope of the invention, it is intended that all matter contained in the foregoing description or shown in the accompanying drawings shall be interpreted as illustrative rather than limiting. For example, the system and method could be used on the set of a movie or on a political campaign. Thus, the breadth and scope of the present invention should not be limited by any of the above-described exemplary embodiments, but should be defined only in accordance with the following claims appended hereto and their equivalents.

What is claimed is:

1. A method for database management comprising:
   reading identification data from an identification device;
   querying a computer database to determine whether the identification data is stored in the computer database;
   electronically storing classification data in a data memory that identifies an item associated with the identification device if the identification data is not stored in the database;
   receiving a state identifier indicating a state of the item associated with the identification device;
   determining whether the item has been checked out to a predetermined individual, wherein the use of the item by the predetermined individual transforms the item into a unique authenticated item;
   modifying the state of the state identifier to indicate that the item is a unique authenticated item; and
   storing the state of the state identifier with the identification data.

2. The method of claim 1 further comprising:
   querying the database to receive ownership data associated with the identification data; and
   modifying the ownership data.

3. The method of claim 1 further comprising:
   querying the database to receive state data associated with the identification data; and
   determining whether the state data is in a predetermined set of allowable state data.

4. The method of claim 1 wherein storing the state of the state identifier with the identification data comprises setting a flag in the database associated with the state identifier.

5. The method of claim 1 wherein receiving the state identifier indicating the state of the item associated with the identification device comprises the state identifier identifying the physical state of the item.

6. A method for database query formulation and access comprising the steps of:
   reading identification data from an identification tag that uniquely identifies an item;
   storing in an electronic database the identification data and classification data that identifies the item;
   receiving a first state identifier indicating a predetermined individual prior to the use of the item by the individual, wherein the use of the item by the predetermined individual results in the item becoming an authenticated unique item;
   storing in the database the first state identifier with the identification data;
   receiving a second state identifier and the identification data;
   querying the database to determine the first state identifier associated with the identification data;
   determining whether the second state identifier is an allowed state identifier based on the first state identifier;
   rejecting the second state identifier if the second state identifier is not an allowed state identifier based on the first state identifier; and
   storing in the database the second state identifier with the first state identifier and the identification data if the second state identifier is an allowed state identifier.

7. The method of claim 6 herein storing the second state identifier further comprises recording the usage of the item.

8. The method of claim 7 further comprising:
   receiving a third state identifier and the identification data;
   querying the database to determine the first state identifier and the second state identifier associated with the identification data;
   determining whether the third state identifier is an allowed state identifier based on the first state identifier and the second state identifier;
   rejecting the third state identifier if the third state identifier is not an allowed state identifier based on the first state identifier and the second state identifier; and
   storing the third state identifier with the first state identifier, the second state identifier and the identification data if the third state identifier is an allowed state identifier.

9. A system for database query formulation and access comprising;
   an identification tag reader reading identification data from an identification tag;
   a database query system querying a database to determine whether the identification data is stored in the database;
   a database input system storing data that identifies a unique item associated with the identification tag with the identification data if the identification data is not stored in a database;
   a state system receiving a state identifier indicating a state of the item associated with the identification tag if the identification data is stored in the database;
   an asset creation system determining whether the state identifier is an allowed state identifier by determining whether a state of the state identifier indicates that the item has been authenticated; and
   the asset creation system storing the state identifier with the identification data if the state identifier is an allowed state identifier so as to allow the authenticated item to be tracked.

10. The system of claim 9 wherein the asset creation system queries an individual profile database to determine whether an individual is an asset creating individual, and the state identifier indicates that the item has been authenticated by virtue of having been used by the asset creating individual.

11. The system of claim 9 wherein the asset creation system determines whether the item is being used in a professional sporting event.

12. The system of claim 9 wherein the asset creation system records a use of the item with the state identifier and the identification data if the state identifier is an allowed state identifier.

13. The system of claim 9 further comprising an equipment reorder system generating an order for a replacement of the item if the state identifier is an allowed state identifier.

14. The system of claim 9 wherein the asset creation system comprises asset creation means for determining whether the state identifier is an allowed state identifier.

15. The system of claim 9 wherein the state system comprises state means for receiving the state identifier indicating the state of the item associated with the identification tag.

16. The system of claim 9 wherein the identification tag reader comprises identification tag reader means for reading the identification data from the identification tag.

17. The system of claim 9 wherein the state system comprises issue equipment means for identifying an individual, identifying an equipment group, and identifying an equipment type and determining whether to create personalized transactions.

18. The system of claim 9 wherein the state system comprises issue equipment means for identifying an individual, identifying an equipment group, and identifying an equipment type and determining whether to create assets.

* * * * *

UNITED STATES PATENT AND TRADEMARK OFFICE
CERTIFICATE OF CORRECTION

PATENT NO. : 8,370,225 B2
APPLICATION NO. : 12/950585
DATED : February 5, 2013
INVENTOR(S) : Tommy Lee Davis, Jr. and David Earl Doser, Jr.

Page 1 of 1

It is certified that error appears in the above-identified patent and that said Letters Patent is hereby corrected as shown below:

IN THE CLAIMS:

Column 7, line 30, in claim 7, replace "herein" with "wherein"

Signed and Sealed this
Ninth Day of April, 2013

Teresa Stanek Rea
*Acting Director of the United States Patent and Trademark Office*